(12) United States Patent
Roth

(10) Patent No.: US 6,454,232 B1
(45) Date of Patent: Sep. 24, 2002

(54) STIFFENER APPARATUS FOR STABILIZING A HANGER ROD

(76) Inventor: Steven A. Roth, P.O. Box 0933, Alamo, CA (US) 94507

( * ) Notice: Subject to any disclaimer, the term of this patent is extended or adjusted under 35 U.S.C. 154(b) by 0 days.

(21) Appl. No.: 09/836,955

(22) Filed: Apr. 17, 2001

Related U.S. Application Data

(63) Continuation-in-part of application No. 09/610,510, filed on Jul. 6, 2000.

(51) Int. Cl.⁷ .................................................. F16B 1/00
(52) U.S. Cl. ............................... 248/228.1; 248/226.11; 248/230.5; 248/49; 248/229.14; 248/229.24; 248/231.61
(58) Field of Search .............................. 248/231.61, 49, 248/68.1, 229.14, 229.24, 230.5, 58, 74.1, 71, 72, 226.11, 228.1, 62, 507, 218.4

(56) References Cited

U.S. PATENT DOCUMENTS

| | | | | |
|---|---|---|---|---|
| 719,230 A | * | 1/1903 | Kinchla | 248/230.5 |
| 2,098,687 A | * | 11/1937 | Kinsfather | 384/27 |
| 3,208,560 A | * | 9/1965 | Cote | 403/252 |
| 3,269,679 A | * | 8/1966 | Grappo | 248/72 |
| 3,318,561 A | * | 5/1967 | Finke et al. | 248/218.4 |
| 3,595,505 A | * | 7/1971 | Burwell et al. | 248/539 |
| 3,713,613 A | * | 1/1973 | Searls | 248/49 |
| 4,270,251 A | * | 6/1981 | Evans et al. | 24/277 |
| 4,415,188 A | * | 11/1983 | Ginter, Jr. | 285/420 |
| 4,506,418 A | * | 3/1985 | Vlola et al. | 24/277 |
| 4,793,580 A | * | 12/1988 | Richards | 248/188 |
| 4,860,985 A | * | 8/1989 | Olson et al. | 248/229 |
| 4,909,463 A | * | 3/1990 | Zvanut et al. | 248/219.4 |
| 4,993,670 A | * | 2/1991 | Tesar | 248/68.1 |
| 4,998,691 A | * | 3/1991 | Brown | 248/74.1 |
| 5,044,584 A | * | 9/1991 | Lin | 248/68.1 |
| 5,403,032 A | * | 4/1995 | Hellwig | 280/124.163 |
| 5,427,469 A | * | 6/1995 | Galarynk | 403/396 |
| 5,718,403 A | * | 2/1998 | Ott et al. | 248/228.1 |
| 6,138,407 A | * | 10/2000 | Pierce | 47/46 |

FOREIGN PATENT DOCUMENTS

| | | | |
|---|---|---|---|
| DE | 199 46 802 A1 | * | 4/2001 |
| JP | 407336867 A | * | 12/1995 |
| JP | 2000-318640 | * | 11/2000 |

OTHER PUBLICATIONS

P. 18 of the B–Line Systems, Inc. Catalog dated May 23, 1990.

* cited by examiner

Primary Examiner—Leslie A. Braun
Assistant Examiner—Steven Marsh
(74) Attorney, Agent, or Firm—Thomas R. Lampe

(57) ABSTRACT

Stiffener apparatus for stabilizing a hanger rod includes a clamp, a plate and an elongated stiffener member. The plate has an indented portion receiving a hanger rod and maintaining the hanger rod at a fixed location relative to the stiffener apparatus when clamped in place.

2 Claims, 2 Drawing Sheets

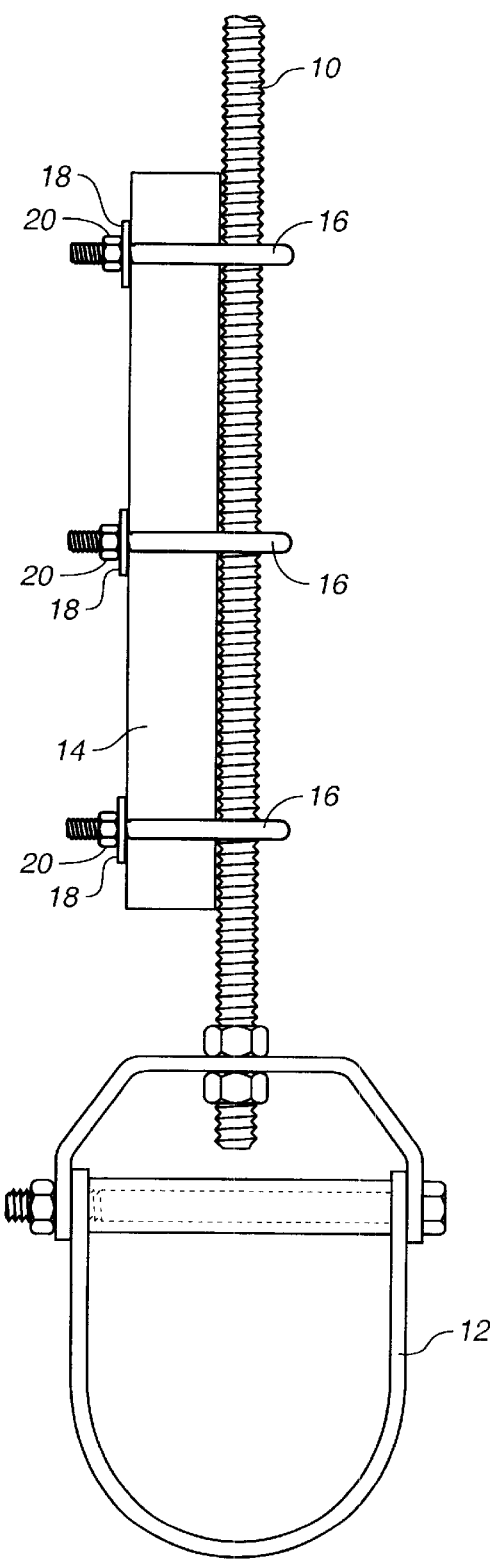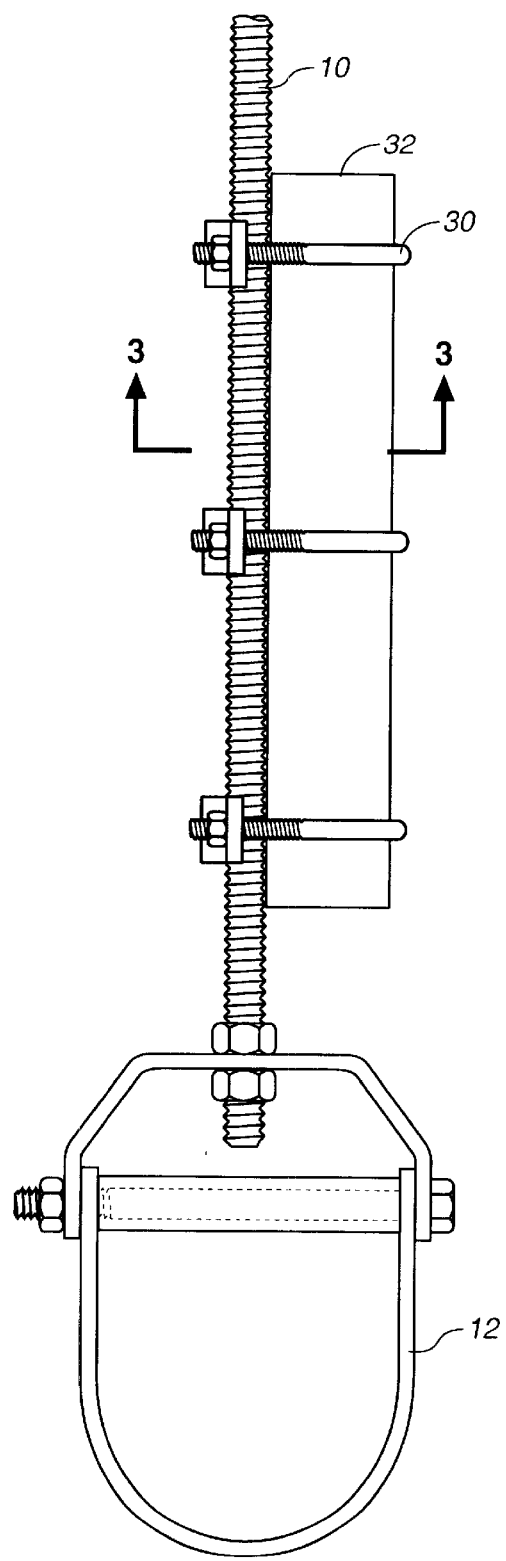
FIG._1
*(PRIOR ART)*
FIG._2

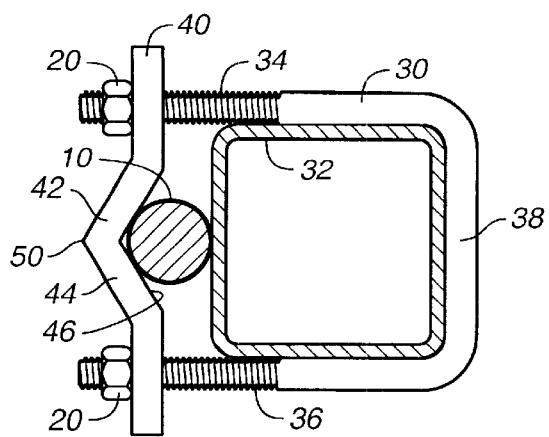
FIG._3
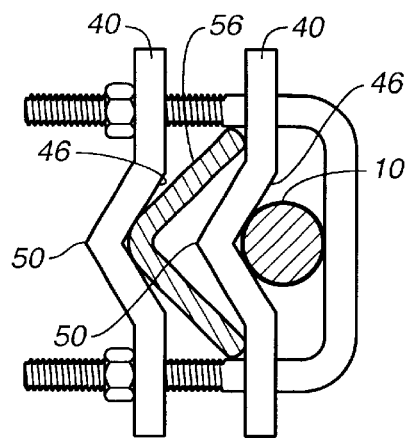
FIG._6
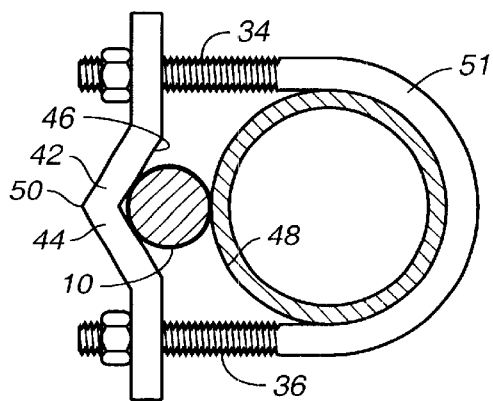
FIG._4
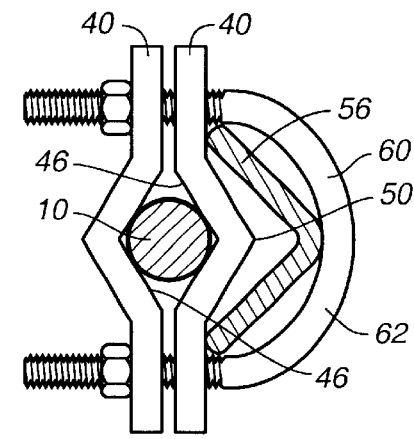
FIG._7
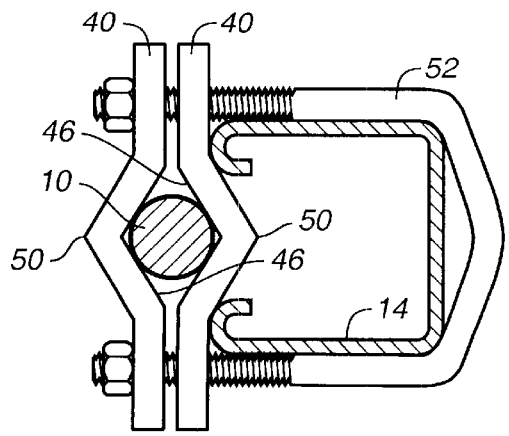
FIG._5
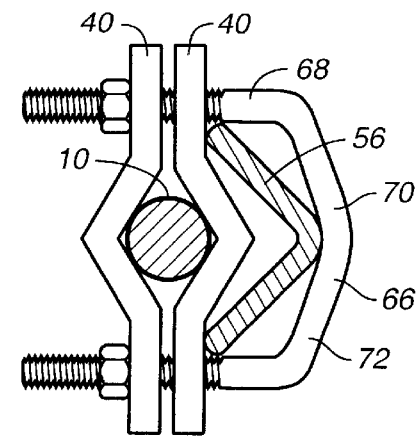
FIG._8

STIFFENER APPARATUS FOR STABILIZING A HANGER ROD

This application is a continuation-in-part of U.S. patent application Ser. No. 09/610,510, filed Jul. 6, 2000.

TECHNICAL FIELD

This invention relates to apparatus employed in the building construction industry and more particularly to stiffener apparatus for stabilizing a hanger rod employed to hold or support pipes, conduits or other components of a building from building structure.

BACKGROUND OF THE INVENTION

Various types of assemblies or devices have been devised for stabilizing or stiffening hanger rods, for example, for seismic bracing purposes. Such devices are often, but not always, associated with multi-directional bracing for electrical conduit, cable trays and mechanical piping systems.

One common type of hanger rod stiffener assembly is that exemplified by the SC228 hanger rod assembly and the B22 channel combination made available by B-Line Systems, Inc. of Franklin Park, Ill. in which a clamp is disposed inside the channel rod stiffener to capture the threaded hanger rod and stiffen it.

Another well known approach that is that exemplified by the SC-UB hanger rod stiffener assembly utilized with the B22 channel, also made available by B-Line Systems, Inc. wherein a U-bolt is connected to a flat two-hole plate by hex nuts, the threaded hanger rod being captured between the rounded portion of the U-bolt and the channel.

It is also known to use bolts similar to U-bolts but which are straight, rather than curved, at the closed end thereof, the straight closed end being orthogonal to the threaded legs of the bolt. Hanger rod slippage is a problem with this arrangement.

Prior art hanger rod stabilizer assemblies or devices have certain inherent limitations. For example, they are often restricted as to size and the same assembly can not be used for both large and small diameter rods. Virtually all such devices must utilize channel or uni-strut material as the stiffener component per se. Channels can, once they get to be a certain length, also become structurally unstable.

It is also known to weld a hanger rod to a stiffener. This is time consuming and expensive. Furthermore, such a connection is permanent and the stiffener is not removable from the rod once welded into place.

The invention disclosed and claimed in my co-pending U.S. patent application Ser. No. 09/610,510, filed Jul. 6, 2000, relates to apparatus used to stiffen both large and small diameter rods; that is, one side of rod stiffener apparatus constructed in accordance with the teachings of the invention of application Ser. No. 09/610,510 accommodates itself to many different hanger rod sizes. In addition, stiffeners other than open channels may be employed with such an arrangement. For example, pipes or square or other rectangular-shaped tubes may be utilized as stiffeners.

According to the arrangement of my above-referenced, co-pending patent application, a clamp is provided having two straight, double-ended, spaced, parallel first and second clamp segments threaded over at least portions of the length thereof and a third clamp segment integral with and extending between ends of the first and second clamp segments. Also included in the apparatus is a plate defining spaced openings. Ends of the first and second clamp segments remote from the third clamp segment project through the spaced openings and nuts are threadedly engaged therewith.

An elongated stiffener member is disposed between the plate and the third clamp segment for engaging a hanger rod extending parallel to the elongated stiffener member and cooperable with the clamp to maintain the hanger rod in a predetermined position relative to the elongated stiffener and the clamp. At least a portion of the third clamp segment is straight, non-orthogonally disposed relative to the first and second clamp segments, and cooperable with the elongated stiffener member to continuously exert lateral forces on the hanger rod continuously urging the hanger rod toward the predetermined position when the hanger rod is clamped between the clamp and the elongated stiffener member.

DISCLOSURE OF INVENTION

The present invention also relates to rod stiffener apparatus utilized to stabilize a hanger rod and which is readily useable to stiffen both large and small diameter rods. In addition, stiffeners other than open channels may be employed. For example, pipes or square or other rectangular-shaped tubes may be utilized. The stiffener apparatus may incorporate clamps of both conventional and non-conventional construction. For example, the invention may be utilized with a clamp having a third clamp segment or end segment orthogonally disposed relative to the parallel legs of first and second clamp segments of the clamp or a clamp with a rounded end. The apparatus of this invention can also utilize clamps similar to those disclosed in my above-referenced co-pending application which utilize third clamp segments (end segments) at least partially non-orthogonally disposed relative to the legs of the clamp.

The clamp employed in the stiffener apparatus of the present invention has two straight, double-ended, spaced first and second clamp segments threaded over at least portions of the lengths thereof. The clamp also includes a third clamp segment or end segment integral with and extending between ends of the first and second clamp segments.

At least one plate is provided defining spaced openings, the first and second clamp segments received in the spaced openings with ends of the first and second clamp segments remote from the third clamp segment projecting from the spaced openings. The at least one plate defines an indent.

Nuts are threadedly engaged with the ends of the first and second clamp segments to connect the clamp to the at least one plate.

An elongated stiffener member is disposed in a space between the at least one plate and the third clamp segment, the at least one plate for engaging a hanger rod extending parallel to said elongated stiffener member with said hanger rod disposed in the indent to maintain the hanger rod in a predetermined position relative to the elongated stiffener member and the clamp.

Other features, advantages and objects of the present invention will become apparent with reference to the following description and accompanying drawings.

BRIEF DESCRIPTION OF DRAWINGS

FIG. 1 illustrates a threaded hanger rod being stiffened by a prior art rod stiffener assembly and employed to support a pipe holder;

FIG. 2 is a view similar to FIG. 1 but illustrating apparatus constructed in accordance with the teachings of the present invention stiffening a hanger rod which in turn supports a pipe holder;

FIG. 3 is an enlarged cross-sectional view taken along the line 3—3 of FIG. 2;

FIG. 4 is a cross-sectional view similar to FIG. 3 illustrating an alternative embodiment of the invention wherein the stiffener member is a conduit having a circular cross-section and utilizing a clamp having a rounded third clamp segment;

FIG. 5 illustrates another alternative arrangement wherein two plates are employed to capture a hanger rod and cooperate with a channel disposed in a clamp having a third clamp segment comprised of two angularly disposed portions;

FIG. 6 is a cross-sectional view of yet another alternate embodiment of the invention employing two plates and utilizing the plates to capture a hanger rod and elongated stiffener member having a V-shaped cross-section;

FIG. 7 shows still another embodiment of the invention wherein a stiffener member having a V-shaped cross-section is disposed between the rounded third clamp segment of a clamp and wherein a hanger rod is located in two opposed recesses of adjacent plates; and FIG. 8 depicts another embodiment of the invention in cross-section wherein two plates cooperate with a clamp having a third clamp segment comprised of two angularly disposed portions to capture a rod hanger and a stiffener member having a V-shaped cross-section.

MODES FOR CARRYING OUT THE INVENTION

FIG. 1 illustrates a typical prior art stiffener assembly utilized to stiffen a threaded hanger rod 10 supporting a pipe holder bracket or yoke 12. The assembly includes an elongated stiffener member in the form of a channel 14 extending along hanger rod 10.

A plurality of U-bolts 16 have the free-threaded ends thereof passing through holes formed in plates 18 and secured in place relative thereto by nuts 20. The plates 18 are flat. When the nuts 20 are tightened, hanger rod 10 has front and rear clamping forces exerted thereon by U-bolts 16 and channel 14.

As is explained in greater detail in my co-pending U.S. application Ser. No. 09/610,510, the prior art approach disclosed in FIG. 1 is employed for use with larger diameter hanger rods and cannot be used for smaller diameter rods due to the fact that the curvature of the U-bolt 16 limits the extent to which the channel 14 can approach the outer curved end of the U-bolt. A totally different arrangement (not shown) must typically be utilized to stiffen hanger rods of smaller diameter. Reference may be had to my co-pending application for further disclosure of this prior art approach.

In contrast, and as will be seen below, the apparatus of the present invention may be utilized to stiffen rods of both large and small diameter or cross-section. Furthermore, different clamp shapes may be utilized in the apparatus of the invention. Likewise, elongated stiffener members of various shapes can be employed.

FIGS. 2 and 3 illustrate a first embodiment of the it present invention wherein a clamp 30 is associated with an elongated stiffener member in the form of a tube having a square cross-sectional configuration, the tube being identified by reference numeral 32. The clamp 30 has two straight, double-ended, spaced, parallel clamp segments 34, 36 threaded over portions of the lengths thereof. As is conventional, a third clamp segment or end segment 38 is integral with and extends between ends of clamp segments 34, 36. The third clamp segment is straight and orthogonally disposed relative to the first and second clamp segments.

The stiffener apparatus of FIGS. 2 and 3 includes a plate 40 defining spaced openings receiving first and second clamp segments 34, 36. The ends of the first and second clamp segments remote from the third clamp segment 38 project from the spaced openings.

Plate 40 includes two angularly disposed, attached plate segments 42, 44 defining an indent or recess 46.

The hanger rod 10 is positioned in indent 46 and is clamped in the space between the plate 40 and the elongated stiffener member 32 when the nuts 20 are tightened. The angularly disposed, attached plate segments 42, 44 continuously urge the hanger rod 10 toward a specific predetermined position mid-way between the ends of plate 40 when the hanger rod and elongated stiffener member are clamped between the plate 40 and the third clamp segment 38. It will be appreciated that the arrangement may readily be used with hanger rods of differing diameters. Also the indent 46 may be located other than at the mid-point of the plate.

FIG. 4 discloses an alternative arrangement wherein the elongated stiffener member comprises a tube 48 having a circular cross-section. Such an arrangement may be appropriate, for example, when the third clamp segment or end segment of the clamp is rounded as indicated by reference numeral 51.

In FIG. 5, stiffener apparatus constructed in accordance with the teachings of the present invention includes two plates 40 having the indents or recesses 46 thereof facing in opposite directions, i.e. disposed in opposition to one another. The hanger rod 10 is clamped into place in both of the indents or recesses.

In this embodiment of the invention, the elongated stiffener member is a channel 14 of conventional construction. It will be noted that the plates 40 form detents 50 opposite their respective indents. In FIG. 5 the detent 50 of one of the plates 40 is located in a recess defined by channel 14, further adding to the overall stability of the assembly. The clamp 52 shown in FIG. 5 has a third clamp segment comprising angularly disposed clamp segment portions.

In the embodiment of FIG. 6, two plates 40 are employed, both plates receiving the first and second clamp segments of the associated clamp. The plates 40 have their indents or recesses 46 oriented in the same direction. The same is true with respect to the detents or projections 50 thereof.

Clamped between the plates 40 is an elongated stiffener member in the form of a channel 56 having a V-shaped cross-sectional configuration. The apex of the V-shaped configuration is positioned in the indent 46 of one of the plates 40 and the detent 50 of the other plate 40 is positioned in the recess of the channel.

FIG. 7 illustrates a clamp 60 having a rounded third clamp segment 62. A V-shaped channel 56 is clamped between the clamp segment 62 and one of two plates 40, the detent 50 of that plate entering the recess of the channel. The indents 46 of the two plates are oriented in opposed directions, i.e. face toward one another, and the hanger rod 10 is clamped between the plates.

FIG. 8 shows an embodiment of the invention which is quite similar to that of FIG. 7, except that the third clamp segment 66 of the clamp 68 is formed of two angularly disposed third clamp segment portions 70, 72.

The invention claimed is:

1. In combination:

a hanger rod for supporting one or more components of a building from building structure;

a clamp having a straight first clamp segment and a straight second clamp segment spaced from said first clamp segment and parallel thereto, both said first clamp segment and said second clamp segment being double-ended and threaded over at least a portion of the length thereof, said clamp including a third clamp segment integral with and extending between ends of said first clamp segment and said second clamp segment;

at least one plate connected to said clamp and defining spaced openings, ends of said first clamp segment and said second clamp segment remote from said third clamp segment projecting through said spaced openings, said at least one plate defining an indent, said first clamp segment and said second clamp segment disposed on opposed sides of said hanger rod, and said third clamp segment and said at least one plate disposed on other opposed sides of said hanger rod;

nuts threadedly engaged with the ends of said first and second clamp segments projecting from said spaced openings connecting said clamp to said at least one plate, the connected at least one plate and the clamp surrounding said hanger rod; and an elongated stiffener member surrounded by said at least one plate and said clamp and disposed between said at least one plate and said third clamp segment, said hanger rod extending parallel to said elongated stiffener member, said at least one plate engaging said hanger rod with said hanger rod disposed in said indent, and said nuts urging said at least one plate toward said elongated stiffener member and toward said third clamp segment to exert compressive forces on said hanger rod to maintain the hanger rod in said indent and in a fixed predetermined position relative to said elongated stiffener member and relative to said clamp, and said at least one plate and said clamp applying compressive forces to said elongated stiffener member to prevent movement of said elongated stiffener member relative to said hanger rod, said at least one plate forming a detent in opposition to the indent formed thereby, said elongated stiffener member defining a recess and said detent being positioned in said recess.

2. In combination:

a hanger rod for supporting one or more components of a building from building structure;

a clamp having a straight first clamp segment and a straight second clamp segment spaced from said first clamp segment and parallel thereto, both said first clamp segment and said second clamp segment being double-ended and threaded over at least a portion of the length thereof, said clamp including a third clamp segment integral with and extending between ends of said first clamp segment and said second clamp segment;

two plates connected to said clamp, each plate defining spaced openings, ends of said first clamp segment and said second clamp segment remote from said third clamp segment projecting through the spaced openings with the spaced openings of each plate receiving said first clamp segment and said second clamp segment, at least one plate defining an indent and each of said plates forming a detent, said first clamp segment and said second clamp segment disposed on opposed sides of said hanger rod, and said third clamp segment and at least one of said plates disposed on other opposed sides of said hanger rod;

nuts threadedly engaged with the ends of said first and second clamp segments projecting from said spaced openings connecting said clamp to said plates, at least one of the connected plates and the clamp surrounding said hanger rod; and an elongated stiffener member surrounded by at least one of said plates and said clamp and disposed between at least one of said plates and said third clamp segment, said hanger rod extending parallel to said elongated stiffener member, at least one of said plates engaging said hanger rod with said hanger rod disposed in said indent, and said nuts urging at least one of said plates toward said elongated stiffener member and toward said third clamp segment to exert compressive forces on said hanger rod to maintain the hanger rod in said indent and in a fixed predetermined position relative to said elongated stiffener member and relative to said clamp, and at least one of said plates and said clamp applying compressive forces to said elongated stiffener member to prevent movement of said elongated stiffener member relative to said hanger rod, said elongated stiffener member defining a recess, the detent of at least one of said plates positioned in said recess.

* * * * *